United States Patent

Wakata et al.

Patent Number: 5,514,502
Date of Patent: May 7, 1996

[54] PHOTOPOLYMERIZABLE COMPOSITION, COLOR FILTER, AND PRODUCTION OF COLOR FILTER

[75] Inventors: Yuichi Wakata; Masayuki Iwasaki; Koji Inoue, all of Shizuoka, Japan

[73] Assignee: Fuji Photo Film Co., Ltd., Kanagawa, Japan

[21] Appl. No.: 288,615

[22] Filed: Aug. 10, 1994

[30] Foreign Application Priority Data

Aug. 16, 1993 [JP] Japan .................................. 5-202272

[51] Int. Cl.⁶ ............................................. G02B 5/20
[52] U.S. Cl. ......................... 430/7; 430/961; 430/511; 359/68
[58] Field of Search ..................... 430/7, 961, 511; 359/68

[56] References Cited

U.S. PATENT DOCUMENTS

5,332,650  7/1994  Murata et al. ........................ 430/270

FOREIGN PATENT DOCUMENTS

| 0485626A1 | 5/1992 | European Pat. Off. ................. 359/68 |
| 63-253302 | 10/1988 | Japan . |
| 5-265208 | 10/1993 | Japan . |
| 6-82620 | 3/1994 | Japan ........................................ 430/7 |

*Primary Examiner*—Cynthia Hamilton
*Attorney, Agent, or Firm*—Sughrue, Mion, Zinn, Macpeak & Seas

[57] ABSTRACT

An alkali-developable photopolymerizable composition is comprises (1) a photopolymerization initiator or a photopolymerization initiator system, (2) an addition polymerizable monomer having an ethylenically unsaturated double bond, and (3) a resin obtained by reacting a copolymer comprising at least a repeating unit represented by formula (I):

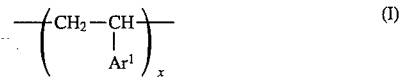

wherein $Ar^1$ is described in the body of the specification; and x represents a molar content of the repeating unit in the copolymer, ranging from 0.85 to 0.55, and a repeating unit represented by formula (II):

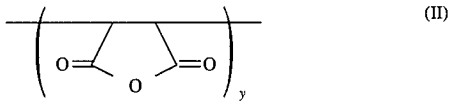

wherein y represents a molar content of the repeating unit in the copolymer, ranging from 0.15 to 0.45, with a primary amine represented by formula (III):

$$Ar^2-R-NH_2 \quad (III)$$

wherein R represents a straight-chain or branched alkylene group having from 1 to 6 carbon atoms; and $Ar^2$ is described in the body of the specification at a ratio of from 0.1 to 1.0 molar equivalent of the primary amine to the acid anhydride group of the copolymer. A cured film of the composition is useful as a protective layer for a color filter of liquid crystal display panels.

7 Claims, No Drawings

PHOTOPOLYMERIZABLE COMPOSITION, COLOR FILTER, AND PRODUCTION OF COLOR FILTER

FIELD OF THE INVENTION

This invention relates to a photopolymerizable composition which can be developed with an alkali aqueous solution to provide a cured product having excellent chemical resistance even after heat treatment. More particularly, it relates to a photopolymerizable composition useful for the formation of a protective layer of a color filter, to a color filter produced by using the photopolymerizable composition, and to a process for producing the color filter.

BACKGROUND OF THE INVENTION

A color filter, an important part of a liquid crystal display panel, must satisfy various requirements. In particular, the heat resistance and chemical resistance of a color filter are of importance in the production of super-twisted nematic (STN) or ferroelectric liquid crystal (FLC) display panels, in which a transparent conductive layer is to be formed on the color filter and further processed into a transparent electrode.

Color liquid crystal display panels are generally prepared by forming a multicolor image layer on a transparent glass substrate. The multicolor image layer generally comprises red, green, and blue pixels with alternately matrix arrangement. Though a size of the pixel is dependent on purpose for use, rectangular pixels, one side of which has a length of about from 10 to 100 μm, and another side of which has a length of about from 50 to 400 μm, is generally used. A shape of the pixels is not restricted to rectangle, and a pixel having a desired shape may be used according to purpose for use. In some cases, a multicolor image layer having black pixels or a light-shielding black matrix between or on the border of the pixels may be used.

A protective layer is formed on the multicolor image layer to obtain a color filter. Further, a transparent conductive layer is usually formed on the protective layer by sputtering indium-tin oxide (ITO). For producing an STN type or FLC display panel, the transparent conductive layer is processed into a transparent electrode by photolithography to obtain a color filter having an electrode. An orientation film is then provided thereon. The resulting substrate with a color filter is then assembled with another transparent substrate having a transparent electrode and an orientation film at a given gap therebetween by inserting spacers to produce a cell, and a liquid crystal is sealed into the cell.

Throughout the above-mentioned series of operations, the protective layer on the multicolor image layer should fulfill the following five requirements. (1) It should assure the flatness of the layer. (2) It should have sufficient hardness to ensure that the spacer does not sink into the cell gap and to ensure the presence of the prescribed cell gap. (3) It should be resistant to the various chemicals used in the photolithographic processing of the transparent conductive layer, such as the solvent of a photoresist, an acidic etchant, an alkaline resist stripper, and the solvent of a coating composition for an orientation film. (4) It should be transparent in the visible light region and be free from cloudiness or turbidity. (5) It should have excellent adhesion not only to the multicolor image layer but to the substrate, in case it is formed directly on the substrate in the absence of a multicolor image layer.

To meet these requirements, it has been proposed to use such a thermosetting resin (or a composition) as a composition comprising an epoxy compound and a polycarboxylic acid or an anhydride thereof as disclosed in JP-A-60-216307 (the term "JP-A" as used herein means an "unexamined published Japanese patent application"), a nylon resin as described in JP-A-60-244932, and a composition comprising a melamine compound and an epoxy resin as described in JP-A-63-131103. A protective layer made of these thermosetting resins practically satisfies requirements (1) to (4) above.

On the other hand, there has been a demand that the protective layer on the non-image area should be removable from the transparent substrate, and the protective layer on a scribe line should be removable as described in JP-A-57-42009, JP-A-1-130103 and JP-A-1-134306. In this regard, it is difficult to selectively form a protective layer with good precision using the above-mentioned thermosetting resins.

Moreover, these thermosetting resins generally comprise a combination of an epoxy resin and a curing agent. These two reactive components, if allowed to stand in a mixed state, undergo a reaction with time which results in an increased viscosity. A coating composition having such an increased viscosity not only has a short pot life but fails to provide a coating film having a uniform and precise thickness.

In order to overcome this problem, it has been suggested that a photosensitive resin be used as the material of the protective layer, which cures on exposure to light and which can be developed to remove the unnecessary part.

Known photosensitive resins which have been proposed for use as the protective layer on the multicolor image layer include the ultraviolet-curing resin disclosed in JP-A-57-42009 and JP-A-60-244932, the vinylcarbonyl-containing polymer described in JP-A-59-7317, the photosensitive resin comprising polyvinyl alcohol and a photosensitive agent described in JP-A-59-184325, the rubber resins of JP-A-60-42704, and a photosensitive resin composition having the same component, except not containing pigment, as the photosensitive resin composition having a dispersed pigment, proposed for use as a colored layer as disclosed in JP-A-2-191901.

It is most desirable to form a protective layer by using a photosensitive resin which cures on exposure to light and can be developed with an alkali aqueous solution, as it is advantageous to health and environmental protection, and, after curing, can be rendered more alkali-resistant by heating (post-heating). A known method is that using the compositions described in JP-A-3-126950, JP-A-52-132091, and JP-B-4-20923 (the term "JP-B" as used herein means an "examined published Japanese patent application").

However, when this method is applied in the form of a coating film, these photosensitive compositions are still unsatisfactory for the formation of a protective layer in terms of developability, non-tackiness, alkali-resistance after post-heating, solvent resistance, transparency, and adhesion to a substrate. It is possible to form a photopolymerizable layer comprising such a photosensitive composition on a temporary substrate, which can then be transferred to a permanent substrate. However, the photopolymerizable layer made with a conventional photosensitive composition has insufficient transfer properties.

Further, where a transparent conductive layer is formed on a conventional protective layer, the protective layer, though resistant to the aforesaid various chemicals (a solvent of a photoresist, an acidic etchant, an alkaline resist stripper, and a solvent of a coating composition for an orientation film), causes the transparent conductive layer to crack.

SUMMARY OF THE INVENTION

An object of the present invention is to provide an alkali-developable photopolymerizable composition having a protective layer (OC layer) that is (1) flat, (2) hard, (3) chemical resistant, (4) transparent, (5) adherent to a substrate, and (6) suitable for forming a transparent conductive layer thereon, and particularly a binder resin constituting the composition.

Another object of the present invention is to provide a photopolymerizable composition whose cured product can be rendered more alkali resistant by post-heating at a relatively low temperature in a reduced heating time so that the amount of component that evaporates during post-heat treatment may be minimized.

A further object of the present invention is to provide a process for producing a color filter particularly useful for liquid crystal display panels, in which the formation of a protective layer on a multicolor image layer is conducted by the application of the above-mentioned photopolymerizable composition or by transferring a layer separately prepared from the above-mentioned photopolymerizable composition.

As a result of extensive investigations, the inventors have found that the above objects of the present invention are accomplished by a photopolymerizable composition comprising (1) a photopolymerization initiator or a photopolymerization initiator system, (2) an addition polymerizable monomer having an ethylenically unsaturated double bond, and (3) a resin obtained by reacting a copolymer comprising at least a repeating unit represented by formula (I):

(I)

wherein $Ar^1$ represents a phenyl group or a phenyl group substituted with an alkyl group having from 1 to 4 carbon atoms, an alkoxy group having from 1 to 4 carbon atoms, an aryl group having from 6 to 10 carbon atoms, an aralkyl group having from 8 to 12 carbon atoms, a halogen atom, or a combination of two or more of these substituents; and x represents a molar content of the repeating unit in the copolymer, ranging from 0.85 to 0.55, and a repeating unit represented by formula (II):

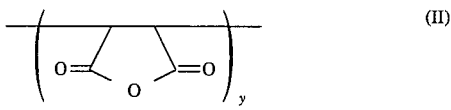
(II)

wherein y represents a molar content of the repeating unit in the copolymer, ranging from 0.15 to 0.45, and wherein the copolymer has a number average molecular weight of from 500 to 30,000,
with a primary amine represented by formula (III):

$Ar^2$—R—$NH_2$ (III)

wherein R represents a straight-chain or branched alkylene group having from 1 to 6 carbon atoms; and $Ar^2$ represents an aryl group or an aryl group substituted with an alkyl group having from 1 to 4 carbon atoms, an alkoxy group having from 1 to 4 carbon atoms, an aryl group having from 6 to 10 carbon atoms, an aralkyl group having from 8 to 12 carbon atoms, a halogen atom, or a combination of two or more of these substituents,
at a ratio of from 0.1 to 1.0 molar equivalent of the primary amine to the acid anhydride group of the copolymer.

DETAILED DESCRIPTION OF THE INVENTION

The copolymer which can be used in the present invention comprises the repeating unit of formula (I) and the repeating unit of formula (II) in a molar ratio of x=0.85 to 0.55 and y=0.15 to 0.45, and preferably x=0.80 to 0.55 and y=0.20 to 0.45. If x is less than 0.55, the exposed and cured area of the photopolymerizable composition is not sufficiently resistant to an alkaline developing solution. If x exceeds 0.85, the unexposed and uncured area of the photopolymerizable composition has poor developability in an alkaline developing solution.

The copolymer has a number average molecular weight of from 500 to 30,000, and preferably from 700 to 20,000. A copolymer having a number average molecular weight of less than 500 is difficult to prepare. If the number average molecular weight exceeds 30,000, the exposed area has poor resistance to an alkaline developing solution while the unexposed area has poor alkali developability. Poor alkali developability of the unexposed area would necessitate extending the soaking time in the developing solution; in the meantime, the exposed area is apt to become swollen during development, resulting in the failure to obtain a high quality image.

The copolymer can be obtained by, for example, copolymerizing maleic anhydride and at least one monomer selected from the group described below in an appropriate solvent in the presence of a polymerization initiator.

Examples of the monomer just referred to include styrene, methylstyrene, ethylstyrene, propylstyrene, isopropylstyrene, butylstyrene, sec-butylstyrene, t-butylstyrene, dimethylstyrene, diethylstyrene, methoxystyrene, ethoxystyrene, propoxystyrene, butoxystyrene, vinylbiphenyl, benzylstyrene, chlorostyrene, fluorostyrene, bromostyrene, and chloromethylstyrene.

Other monomers copolymerizable with these monomers may be used as long as the effects of the resin intended in the present invention are not impaired.

Of the above-mentioned copolymers, a styrene-maleic anhydride copolymer is preferred.

The primary amine of formula (III) which is reacted with the copolymer includes benzylamine, phenethylamine, 3-phenyl-1-propylamine, 4-phenyl-1-butylamine, 5-phenyl-1-pentylamine, 6-phenyl-1-hexylamine, α-methylbenzylamine, 2-methylbenzylamine, 3-methylbenzylamine, 4-methylbenzylamine, 2-(p-tolyl)ethylamine, β-methylphenethylamine, 1-methyl-3-phenylpropylamine, 2-chlorobenzylamine, 3-chlorobenzylamine, 4-chlorobenzylamine, 2-fluorobenzylamine, 3-fluorobenzylamine, 4-fluorobenzylamine, 4-bromophenethylamine, 2-(2-chlorophenyl)ethylamine, 2-(3-chlorophenyl)ethylamine, 2-(4-chlorophenyl)ethylamine, 2-(2-fluorophenyl)ethylamine, 2-(3-fluorophenyl)ethylamine, 2-(4-fluorophenyl)ethylamine, 4-fluoro-α,α-dimethylphenethylamine, 2-methoxybenzylamine, 3-methoxybenzylamine, 4-methoxybenzylamine, 2-ethoxybenzylamine, 2-methoxyphenethylamine, 3-methoxyphenethylamine, and 4-methoxyphenethylamine. Preferred of them are benzylamine and phenethylamine.

The reaction ratio of the primary amine is 0.1 to 1.0 molar equivalent, and preferably 0.2 to 1.0 molar equivalent, per equivalent of the maleic anhydride group of the copolymer. If the ratio of the primary amine is less than 0.1 equivalent, the exposed area of the photopolymerizable composition has poor alkali resistance. The amine may be added in excess of the equivalent amount of maleic anhydride to assure the efficient progress of the reaction. In this case, it is preferable to purify the copolymer by reprecipitation or a like means to remove the excess amine.

The content of the resin in the photopolymerizable composition is generally from 20 to 90% by weight, and preferably from 30 to 70% by weight, based on the total solids content of the photopolymerizable composition. The term "the total solids content" used herein means the total content of components remaining after application and drying treatment, i.e., the total content of non-volatile components.

The addition polymerizable monomer having an ethylenically unsaturated double bond includes t-butyl (meth)acrylate, ethylene glycol di(meth)acrylate, 2-hydroxypropyl (meth)acrylate, triethylene glycol di(meth)acrylate, trimethylolpropane tri(meth)acrylate, 2-ethyl-2-butyl-propanediol di(meth)acrylate, pentaerythritol tri(meth)acrylate, pentaerythritol tetra(meth)acrylate, dipentaerythritol hexa(meth)acrylate, dipentaerythritol penta(meth)acrylate, polyoxyethylated trimethylolpropane tri(meth)acrylate, tris(2-(meth)acryloyloxyethyl) isocyanurate, 1,4-diisopropenylbenzene, 1,4-dihydroxybenzene di(meth)acrylate, decamethylene glycol di(meth)acrylate, styrene, diallyl fumarate, triallyl trimellitate, lauryl (meth)acrylate, (meth)acrylamide, and xylylene bis(meth)acrylamide. Additionally, reaction products between a hydroxyl-containing compound, such as 2-hydroxyethyl (meth)acrylate, 2-hydroxypropyl (meth)acrylate or polyethylene glycol mono(meth)acrylate, and a diisocyanate compound, such as hexamethylene diisocyanate, toluene diisocyanate or xylene diisocyanate, can also be used. The preferred addition polymerizable monomers are pentaerythritol tetraacrylate, dipentaerythritol hexaacrylate, dipentaerythritol pentaacrylate, and tris(2-acryloyloxyethyl) isocyanurate. These addition polymerizable monomers may be used either individually or in combination with other copolymerizable monomers.

The total content of the addition polymerizable monomers in the photopolymerizable composition is generally from 10 to 80% by weight, and preferably from 30 to 70% by weight, based on the total solids content of the photopolymerizable composition. If it is less than 10% by weight, the exposed area of the photopolymerizable composition has an inclination to have poor alkali resistance. If it exceeds 80% by weight, the applied photosensitive layer has an inclination to have poor handling properties due to increased tackiness.

Almost all known photopolymerization initiators or initiator systems can be used in the present invention. Examples of suitable initiators or initiator systems include p-methoxyphenyl-2,4-bis(trichloromethyl)-s-triazine, 2-(p-butoxystyryl)-5-trichloromethyl-1,3,4-oxadiazole, 9-phenylacridine, 9,10-dimethylbenzophenazine, benzophenone/Michler's ketone, hexaarylbiimidazole/mercaptobenzimidazole, benzyl dimethyl ketal, and thioxanthone/amine. Preferred of them are trihalomethyl-containing compounds, such as 2-(p-butoxystyryl)-5-trichloromethyl-1,3,4-oxadiazole.

The photopolymerization initiator or initiator system is generally used in an amount of from 0.1 to 20% by weight, and preferably from 0.5 to 5% by weight, based on the total solids content of the photopolymerizable composition. If the amount of the initiator is less than 0.1% by weight, the efficiency of photo-curing has an inclination to be so slow that a prolonged period of time is needed for exposure. If it exceeds 20% by weight, the cured layer has an inclination to have reduced light transmittance in the ultraviolet to visible region, which is unsuitable for use as the protective layer of a color filter.

If desired, the photopolymerizable composition of the present invention may contain known additives, such as plasticizers, fillers, and stabilizers. For applications other than a protective layer for a color filter, the composition may further contain pigments or dyes.

The photopolymerizable composition according to the present invention is particularly suitable as a material for forming the protective layer of a color filter. For this use, the photopolymerizable composition is applied onto a multicolor image layer with pixels formed thereon, and the photopolymerizable layer is processed through exposure, development, heating, and the like to provide a protective layer. Application of the composition onto a multicolor image layer can be achieved by any known technique, such as spray coating or dip coating, or by transferring a layer of the photopolymerizable composition previously formed on a temporary substrate.

The protective layer usually has a thickness of from 0.1 to 50 μm, and preferably from 1 to 5 μm.

The substrates which can be used in the color filter include a metal sheet, a metal-clad laminate, a glass plate, a ceramic plate, and a synthetic resin film. A glass plate or synthetic film having good transparency and dimensional stability is preferred.

The photopolymerizable composition of the present invention is also useful as a material for producing a photosensitive transfer material. A photosensitive transfer material can be prepared by applying the photopolymerizable composition on a temporary substrate, preferably a polyethylene terephthalate film, either directly or, with an oxygen barrier layer, a parting layer, or both a parting layer and an oxygen barrier layer provided therebetween, to form a photosensitive layer. For protection, a strippable cover sheet made of a synthetic resin is usually laminated on the photosensitive layer. The photopolymerizable composition of the invention also applies to the layer structure disclosed in Japanese Patent Application No. 153227, which comprises a temporary substrate having thereon an alkali-soluble thermoplastic resin layer, an intermediate layer, and a photosensitive layer, in this order.

The cover sheet is removed on use, and the photosensitive layer is adhered onto a permanent substrate, for example, a substrate having a multicolor image layer thereon. Then, the temporary substrate is stripped off from the transfer material. Where the temporary substrate has a parting layer, an oxygen barrier layer, or the like, the stripping is conducted at the interface between the said-layer and the temporary substrate. Where the temporary substrate has both a parting layer and an oxygen barrier layer, the stripping is conducted at the interface between the parting layer and the oxygen barrier layer. Where the temporary substrate has neither a parting layer nor an oxygen barrier layer, the stripping is conducted at the interface between the photosensitive layer and the temporary substrate. The photosensitive layer transferred on the multicolor image layer is then exposed to light. When a transparent electrode is to be formed on a protective layer, as in STN mode liquid crystal display panels, the photosensitive layer is exposed through a prescribed photomask and developed to form a patterned protective layer. Development is carried out by washing away the unexposed area, i.e., uncured area, with an appropriate alkaline developing solution. In cases where a transparent conductive layer is to be formed on the entire area of the protective layer, as in TFT (thin film transistor) type liquid crystal displays, no photomask is used.

The developing solution for development of the photopolymerizable composition is a dilute aqueous solution of an alkaline substance, which, if desired, may contain a small amount of a water-miscible organic solvent.

Suitable alkaline substances include alkali metal hydroxides (e.g., sodium hydroxide and potassium hydroxide), alkali metal carbonates (e.g., sodium carbonate and potassium carbonate), alkali metal hydrogen carbonates (e.g., sodium hydrogen carbonate and potassium hydrogen carbonate), alkali metal silicates (e.g., sodium silicate and potassium silicate), alkali metal metasilicates (e.g., sodium metasilicate and potassium metasilicate), triethanolamine, diethanolamine, monoethanolamine, morpholine, tetraalkylammonium hydroxides (e.g., tetramethylammonium hydroxide), and sodium tertiary phosphate. The alkali aqueous solution preferably contains the alkaline substance in a concentration of from 0.01 to 30% by weight and at a pH between 8 and 14.

The water-miscible organic solvents which may be added to the alkali aqueous solution include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and N-methylpyrrolidone. The concentration of the water-miscible organic solvent is from 0.1 to 30% by weight.

The alkali aqueous solution may further contain a conventional surface active agent in a concentration preferably of from 0.01 to 10% by weight.

The developing solution may be used either as a bath or as a spray. Removal of the uncured area of the photopolymerizable layer with the developing solution, i.e., development, can be effected while rubbing with a rotating brush or a wet sponge, etc. The developing solution is preferably used at a temperature of from room temperature to 40° C. If necessary, the development step may be followed by a step of washing with water.

After the development processing, the remaining cured layer is subjected to a post-heat treatment by putting it into an electrical furnace or a drier or by irradiating the cured layer with infrared light. The heating temperature and time depend on the composition of the photopolymerizable composition or the thickness of the cured layer. In general, it is preferred to heat the layer at a temperature of from about 120° C. to 250° C. for about 10 to 60 minutes in order to impart sufficient solvent resistance and alkali resistance.

On the thus formed protective layer, an ITO layer is formed by sputtering. When the ITO layer is processed into a transparent electrode, a photoresist layer is formed on the ITO layer, the photoresist layer is exposed to light through an electrode pattern mask followed by development to form an electrode pattern, the uncovered ITO layer is etched, and the photoresist is removed with a resist stripper. Where an orientation film is further formed on the ITO layer, a coating solution usually comprising a polyimide resin and a polar organic solvent, e.g., N-methylpyrrolidone or γ-butyrolactone, is applied, dried, and orientated.

The photopolymerizable composition according to the present invention is useful as a protective film-forming material for a color filter prepared by any known method, for example, a transfer method, a colored resist method, a dyeing method, a printing method, and an electrodeposition method.

While the photopolymerizable composition is especially suitable for protective film formation on a multicolor image layer, it is also applicable as a resist composition, to which a dye or a pigment is added to make it a colored resist composition having a high chemical resistance for the formation of color filter pixels, as disclosed in JP-A-63-298304; a solder resist for printed circuit boards as disclosed in JP-A-3-223856; a resist for electroless plating as disclosed in JP-A-3-223856; and a composition for forming a protective layer, an interlaminar insulating layer or an adhesive layer of electric elements as disclosed in JP-A-3-126950.

The present invention will now be illustrated in greater detail by way of Examples, but it should be understood that the present invention is not construed as being limited thereto. All the parts, percents, and ratios are by weight unless otherwise indicated.

SYNTHESIS EXAMPLE 1

In 612.8 parts of a mixed solvent of propylene glycol monomethyl ether acetate/methyl ethyl ketone (80/20) was dissolved 153.2 parts of a styrene/maleic anhydride (68/32 by mole) copolymer having a number average molecular weight of 2800. A solution of 26.8 parts (corresponding to 0.5 equivalent to the acid anhydride group in the copolymer) of benzylamine in 107.2 parts of a mixed solvent of propylene glycol monomethyl ether acetate/methyl ethyl ketone (80/20) was added dropwise to the copolymer solution at room temperature over a period of about 1 hour. The mixture was stirred at room temperature for 6 hours to obtain a benzylamine-modified styrene/maleic anhydride copolymer (hereinafter designated resin (1)).

EXAMPLE 1

1) Preparation of Coating Composition for Protective Layer:

The following components were mixed to dissolve and filtered through a filter having an opening size of 0.2 μm to prepare a coating composition for a protective layer.

| | |
|---|---|
| 20% solution of resin (1) in propylene glycol monomethyl ether acetate/propylene glycol monomethyl ether (1/1) | 68 parts |
| Dipentaerythritol hexaacrylate | 3.4 parts |
| Tris(acryloyloxyethyl) isocyanurate | 10.2 parts |
| 2-(4-Butoxystyryl)-5-trichloromethyl-1,3,4-oxadiazole | 0.65 part |
| Hydroquinone monomethyl ether | 0.007 part |
| Fluorine type surface active agent (F177P, produced by Dainippon Ink & Chemicals, Inc.) | 0.002 part |

2) Formation of Protective Layer:

The coating composition prepared in (1) above was applied on a substrate, comprising a 1.1 mm thick glass substrate (350 mm×400 mm) having thereon red (R), green (G) and blue (B) pixels, by spin coating and dried to form a photosensitive layer having a thickness of 3 μm. The photosensitive layer was irradiated with ultraviolet light of 200 mJ/cm$^2$ through a photomask using an aligner having a ultrahigh-pressure mercury lamp as a light source, developed with a spray of a 1% sodium carbonate aqueous solution, and washed with water. The color filter with the thus formed protective layer was heated in a drier set at 200° C. for 20 minutes, followed by cooling.

An ITO layer was deposited on the protective layer by sputtering to a thickness of 0.2 μm. A positive photoresist (FH2130, produced by Fuji Hunt Electronics Technology Co., Ltd.) was formed on the ITO film and exposed to light through an electrode pattern mask, and developed. The ITO film uncovered with the resist was etched with a hydrochloric acid/iron chloride aqueous solution, and the resist was removed with a resist stripper (MS2001, produced by Fuji Hunt Electronics Technology Co., Ltd.). The resulting ITO electrode pattern had no defects. When an adhesive tape was adhered to the ITO electrode and peeled, the ITO electrode did not peel. When an orientation film coating solution (a polyimide resin solution in N-methylpyrrolidone/γ-butyrolactone) was applied thereto by spin coating and dried, the protective layer did not swell. The pencil hardness of the protective layer was 5H. The evaluation results about various properties of the photopolymerizable composition are shown in Table 2.

EXAMPLE 2

The same coating composition for a protective layer as used in Example 1 was applied on a 75 μm thick polyethylene terephthalate film as a temporary substrate and dried to form a photosensitive layer having a thickness of 3 μm. A 15 μm thick cover sheet made of polypropylene was laminated thereon to obtain a photosensitive transfer material for formation of a protective layer.

The cover sheet was stripped off from the photosensitive transfer material, and the photosensitive layer was adhered to the same glass substrate having a multicolor image layer as used in Example 1 by means of a laminator. The temporary substrate was stripped off the transfer material to leave the photosensitive layer on the multicolor image layer. The photosensitive layer was exposed, developed and heated in the same manner as in Example 1 to form a protective layer. ITO was deposited on the protective layer and patterned in the same manner as in Example 1 to form an ITO electrode free from defects. An orientation film was then formed thereon without causing swelling of the protective layer. The pencil hardness of the protective layer was 5H. The evaluation results about various properties of the photopolymerizable composition are shown in Table 4.

SYNTHESIS EXAMPLES 2 TO 22

Maleic acid monoamide-containing resins (designated resins (2) to (22)) were synthesized in the same manner as resin (1) of Synthesis Example 1, except for using the copolymer and amine shown in Table 1 below. Abbreviations in Table 1 have the following meanings:
S=Styrene; M=Maleic anhydride; and VA=Vinyl acetate

TABLE 1

| Synthesis Example No. | Composition (molar ratio) | Number Average Mol. Weight | Amine Kind | Equiv. to Anhydride |
|---|---|---|---|---|
| 1 | S/M (68/32) | 2800 | benzylamine | 0.5 |
| 2 | S/M (68/32) | 2800 | phenethylamine | 0.5 |
| 3 | S/M (68/32) | 2800 | benzylamine | 0.7 |
| 4 | S/M (68/32) | 2800 | phenethylamine | 0.7 |
| 5 | S/M (68/32) | 2800 | α-methylbenzylamine | 0.7 |
| 6 | S/M (68/32) | 2800 | benzylamine | 1.0 |
| 7 | S/M (69/31) | 4000 | " | 0.8 |
| 8 | S/M (69/31) | 4000 | " | 1.0 |
| 9 | S/M (75/25) | 4000 | " | 0.8 |
| 10 | S/M (75/25) | 4000 | phenethylamine | 0.8 |
| 11 | S/M (75/25) | 4000 | benzylamine | 1.0 |
| 12 | S/M/VA (54/38/8) | 2800 | " | 0.5 |
| 13 | S/M/VA (54/38/8) | 2800 | phenethylamine | 0.7 |
| 14 | S/M (68/32) | 2800 | aniline | 0.5 |
| 15 | S/M (68/32) | 2800 | " | 0.7 |

TABLE 1-continued

| Synthesis Example No. | Composition (molar ratio) | Number Average Mol. Weight | Amine Kind | Equiv. to Anhydride |
|---|---|---|---|---|
| 16 | S/M (75/25) | 4000 | " | 0.8 |
| 17 | S/M (68/32) | 2800 | butylamine | 0.5 |
| 18 | S/M (68/32) | 2800 | " | 0.7 |
| 19 | S/M (75/25) | 4000 | " | 0.8 |
| 20 | S/M (50/50) | 4900 | benzylamine | 0.5 |
| 21 | S/M (84/16) | 2800 | phenethylamine | 1.0 |
| 22 | S/M (68/32) | 2800 | benzylamine | 0.05 |

SYNTHESIS EXAMPLE 23

Resin (23) was prepared from an isobutylene/maleic anhydride copolymer having a number average molecular weight of 80,000 and a maleic anhydride unit content of 50 mol %, as disclosed in Preparation Example 1 of JP-A-52-13209, and 0.8 equivalent, to the maleic anhydride group, of butylamine.

SYNTHESIS EXAMPLE 24

Resin (24) was prepared from a styrene/methyl methacrylate/maleic anhydride copolymer having a number average molecular weight of 30,000 and a maleic anhydride unit content of 16 mol %, as disclosed in JP-A-2-97502, and a 1.1 equivalent to the maleic anhydride group, of propylamine.

SYNTHESIS EXAMPLE 25

Resin (25) was prepared from a methyl methacrylate/butyl acrylate/itaconic anhydride copolymer having a number average molecular weight of 36,000 and an itaconic anhydride unit content of 16 mol %, as disclosed in JP-A-2-97502, and 1.1 equivalent to the itaconic anhydride group, of propylamine.

EXAMPLES 3 TO 14 AND COMPARATIVE EXAMPLES 1 TO 12

A coating composition for a protective layer was prepared in the same manner as in Example 1, except for replacing resin (1) with each of resins (2) to (25). The coating composition was applied to a glass substrate and dried to form a protective layer having a thickness of 3 μm, exposed to light, developed with a 1% sodium carbonate aqueous solution at 30° C., and post-heated in the same manner as in Example 1.

Each of the samples obtained in Example 1, Examples 3 to 14 and Comparative Examples 1 to 12 was evaluated as follows.

1. Developability:

A photosensitive layer formed on a glass substrate to a thickness of 3 μm with a spin coater was soaked in a 1% sodium carbonate aqueous solution at 30° C. for 1 minute. It was then observed whether the photosensitive layer dissolved or not.

2. Resistance to Developing Solution:

A photosensitive layer formed on a glass substrate to a thickness of 3 μm with a spin coater was exposed to light of 200 mJ/cm$^2$ through a mask having a rectangular image of 80 μm ×300 μm and soaked in a 1% sodium carbonate aqueous solution at 30° C. for 1 minute. It was observed whether or not the exposed area of the soaking closely adhered to the substrate.

3. Flatness:

A photosensitive layer was formed on a 2 μm thick color filter layer having an uneven surface of 2 μm, which was formed on a glass substrate, to a thickness of 3 μm. The photosensitive layer was exposed to light of 200 mJ/cm$^2$, developed, and post-heated at 200° C. for 60 minutes to form a protective layer. The surface unevenness of the protective layer was measured with a thickness meter to evaluate the flatness. A sample having unevenness of not more than 0.5 μm was graded "good", and a sample having unevenness of more than 0.5 μm was graded "poor".

4. Hardness:

A photosensitive layer was formed on a glass substrate to a thickness of 3 μm. The photosensitive layer was exposed to light of 200 mJ/cm$^2$, developed, and post-heated at 200° C. for 60 minutes. The pencil hardness of the cured film was measured in accordance with JIS K5400.

5. Alkali Resistance:

A photosensitive layer was formed on a glass substrate to a thickness of 3 μm, exposed to light of 200 mJ/cm$^2$, developed, post-heated at 200° C. for 60 minutes, and soaked in a 5% potassium hydroxide aqueous solution at 50° C. for 30 minutes. It was observed whether or not turbidity or wrinkles occurred on the surface of the cured film.

6. Transparency:

A 3 μm thick photosensitive layer formed on a glass substrate was exposed to a light of 200 mJ/cm$^2$, developed, and post-heated at 200° C. for 60 minutes. A sample having a clear surface was graded "good", and a sample having a cloudy surface was graded "poor".

7. Adhesion to Substrate:

A 3 μm thick photosensitive layer formed on a glass substrate was exposed to light of 200 mJ/cm$^2$, developed, and post-heated at 200° C. for 60 minutes. The cured film after the development and after the post-heat treatment were cross-hatched to make 100 squares, and a Mylar tape was adhered thereto and stripped off. A sample retaining 100 squares was graded "good", and a sample which had peeling of one or more squares out of 100 was graded "poor".

8. Suitability for Formation of a Transparent Conductive Layer:

A 3 μm thick photosensitive layer formed on a glass substrate was exposed to light of 200 mJ/cm$^2$, developed, and post-heated at 200° C. for 60 minutes. ITO (tin oxide content: 6%) was deposited on the cured film using a high frequency sputtering apparatus manufactured by Anelva Corporation for 10 minutes under the conditions where the voltage was 800 V, the current was 1.8 A, the output was 270 W, and the argon pressure was $5 \times 10^{-4}$ Torr. The surface conditions of the resulting transparent conductive layer were microscopically observed. The layer was then subjected to an adhesive tape test. A sample having a transparent conductive layer which exhibited a flat and uniform surface and no peeling following the adhesive tape test was regarded as having "good" suitability for forming a transparent conductive film thereon. A sample having a transparent conductive film which exhibited wrinkles or cracks or whose transparent conductive film underwent peeling in the adhesive tape test was regarded as "poor".

The results of the evaluation and measurements are shown in Tables 2 and 3 below.

TABLE 2

| Example No. | Resin No. | Developability | Developing Solution Resistance | Flatness | Hardness | Alkali Resistance | Transparency | Adhesion to Substrate After Development | Adhesion to Substrate After Post-Heating | Transparent Conductive Layer Formation |
|---|---|---|---|---|---|---|---|---|---|---|
| 1 | 1 | good | good | good | 5H | good | good | good | good | good |
| 3 | 2 | good | good | good | 5H | good | good | good | good | good |
| 4 | 3 | good | good | good | 5H | good | good | good | good | good |
| 5 | 4 | good | good | good | 5H | good | good | good | good | good |
| 6 | 5 | good | good | good | 5H | good | good | good | good | good |
| 7 | 6 | good | good | good | 5H | good | good | good | good | good |
| 8 | 7 | good | good | good | 5H | good | good | good | good | good |
| 9 | 8 | good | good | good | 5H | good | good | good | good | good |
| 10 | 9 | good | good | good | 5H | good | good | good | good | good |
| 11 | 10 | good | good | good | 5H | good | good | good | good | good |
| 12 | 11 | good | good | good | 5H | good | good | good | good | good |
| 13 | 12 | good | good | good | 5H | good | good | good | good | good |
| 14 | 13 | good | good | good | 5H | good | good | good | good | good |

TABLE 3

| Compara. Example No. | Resin No. | Developability | Developing Solution Resistance | Flatness | Hardness | Alkali Resistance | Transparency | Adhesion to Substrate After Development | Adhesion to Substrate After Post-Heating | Transparent Conductive Layer Formation |
|---|---|---|---|---|---|---|---|---|---|---|
| 1 | 14 | good | good | good | 5H | good | good | good | good | good |
| 2 | 15 | good | good | good | 5H | good | good | good | good | poor |
| 3 | 16 | good | good | good | 5H | good | good | good | good | poor |
| 4 | 17 | good | good | good | 5H | good | good | good | good | poor |

TABLE 3-continued

| Compara. Example No. | Resin No. | Develop- ability | Developing Solution Resistance | Flatness | Hardness | Alkali Resistance | Transparency | Adhesion to Substrate After Development | Adhesion to Substrate After Post-Heating | Transparent Conductive Layer Formation |
|---|---|---|---|---|---|---|---|---|---|---|
| 5 | 18 | good | good | good | 5H | good | good | good | good | poor |
| 6 | 19 | good | good | good | 5H | good | good | good | good | poor |
| 7 | 20 | good | poor | poor | 4H | poor | good | poor | poor | poor |
| 8 | 21 | poor | good | good | 4H | good | good | good | poor | good |
| 9 | 22 | poor | good | good | 4H | poor | good | poor | poor | poor |
| 10 | 23 | poor | poor | poor | 2H | poor | good | poor | poor | poor |
| 11 | 24 | poor | poor | poor | 2H | poor | good | poor | poor | poor |
| 12 | 25 | poor | poor | poor | HB | poor | good | poor | poor | poor |

EXAMPLES 15 TO 26 AND COMPARATIVE EXAMPLES 13 TO 24

A photosensitive transfer material was obtained in the same manner as in Example 2 except for replacing resin (1) with each of resins (2) to (25). Each of the samples obtained in Examples 15 to 26 and Comparative Examples 13 to 24 was evaluated in the same manner as described above except for replacing application by spin coater with lamination by laminator as described in Example 2. The results of the evaluation and measurements are shown in Tables 4 and 5 below.

TABLE 4

| Example No. | Resin No. | Develop- ability | Developing Solution Resistance | Flatness | Hardness | Alkali Resistance | Transparency | Adhesion to Substrate After Development | Adhesion to Substrate After Post-Heating | Transparent Conductive Layer Formation |
|---|---|---|---|---|---|---|---|---|---|---|
| 2 | 1 | good | good | good | 5H | good | good | good | good | good |
| 15 | 2 | good | good | good | 5H | good | good | good | good | good |
| 16 | 3 | good | good | good | 5H | good | good | good | good | good |
| 17 | 4 | good | good | good | 5H | good | good | good | good | good |
| 18 | 5 | good | good | good | 5H | good | good | good | good | good |
| 19 | 6 | good | good | good | 5H | good | good | good | good | good |
| 20 | 7 | good | good | good | 5H | good | good | good | good | good |
| 21 | 8 | good | good | good | 5H | good | good | good | good | good |
| 22 | 9 | good | good | good | 5H | good | good | good | good | good |
| 23 | 10 | good | good | good | 5H | good | good | good | good | good |
| 24 | 11 | good | good | good | 5H | good | good | good | good | good |
| 25 | 12 | good | good | good | 5H | good | good | good | good | good |
| 26 | 13 | good | good | good | 5H | good | good | good | good | good |

TABLE 5

| Compara. Example No. | Resin No. | Develop- ability | Developing Solution Resistance | Flatness | Hardness | Alkali Resistance | Transparency | Adhesion to Substrate After Development | Adhesion to Substrate After Post-Heating | Transparent Conductive Layer Formation |
|---|---|---|---|---|---|---|---|---|---|---|
| 13 | 14 | good | good | good | 5H | good | good | good | good | good |
| 14 | 15 | good | good | good | 5H | good | good | good | good | poor |
| 15 | 16 | good | good | good | 5H | good | good | good | good | poor |
| 16 | 17 | good | good | good | 5H | good | good | good | good | poor |
| 17 | 18 | good | good | good | 5H | good | good | good | good | poor |
| 18 | 19 | good | good | good | 5H | good | good | good | good | poor |
| 19 | 20 | good | poor | poor | 4H | poor | good | poor | poor | poor |
| 20 | 21 | poor | good | good | 4H | good | good | good | poor | poor |
| 21 | 22 | poor | poor | good | 4H | poor | good | poor | poor | poor |
| 22 | 23 | poor | poor | poor | 2H | poor | good | poor | poor | poor |
| 23 | 24 | poor | poor | poor | 2H | poor | good | poor | poor | poor |
| 24 | 25 | poor | poor | poor | 2H | poor | good | poor | poor | poor |

As can be seen from Tables 2, 3, 4, and 5, the photopolymerizable composition according to the present invention exhibits excellent performance properties.

As described and demonstrated above, the photopolymerizable composition of the present invention has excellent alkali solubility. It produces a photo-cured film having excellent developing solution resistance, hardness, alkali resistance, light transmission (transparency), adhesion to a substrate, and suitability for forming a transparent conductive layer thereon. The photopolymerizable composition is therefore particularly useful for the formation of a protective film of a color filter, wherein the protective film has excellent resistance and flatness.

While the invention has been described in detail and with reference to specific examples, it will be apparent to one skilled in the art that various changes and modifications can be made without departing from the spirit and scope thereof.

What is claimed is:

1. A color filter comprising a layered element having in the following order: a transparent substrate, a multicolor image layer comprising a matrix of at least red, green, and blue pixels, and a protective layer comprising a cured product of a photopolymerizable composition comprising, (1) a photopolymerization initiator or a photopolymerization initiator system, (2) an addition polymerizable monomer having an ethylenically unsaturated double bond, and (3) a resin obtained by reacting: a copolymer comprising at least a repeating unit represented by formula (I):

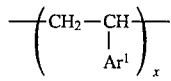

wherein $Ar^1$ represents a phenyl group or a phenyl group substituted with an alkyl group having from 1 to 4 carbon atoms, an alkoxy group having from 1 to 4 carbon atoms, an aryl group having from 6 to 10 carbon atoms, an aralkyl group having from 8 to 12 carbon atoms, a halogen atom, or a combination of two or more of these substituents; and x represents a molar content of the repeating unit in the copolymer, ranging from 0.85 to 0.55, and a repeating unit represented by formula (II):

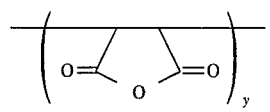

wherein y represents a molar content of the repeating unit in the copolymer, ranging from 0.15 to 0.45, and wherein the copolymer has a number average molecular weight of from 500 to 30,000, with a primary amine represented by formula (III):

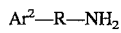

wherein R represents a straight-chain or branched alkylene group having from 1 to 6 carbon atoms; and $Ar^2$ represents an aryl group or an aryl group substituted with an alkyl group having from 1 to 4 carbon atoms, an alkoxy group having from 1 to 4 carbon atoms, an aryl group having from 6 to 10 carbon atoms, an aralkyl group having from 8 to 12 carbon atoms, a halogen atom, or a combination of two or more of these substituents, at a ratio of from 0.1 to 1.0 molar equivalent of the primary amine to the acid anhydride group of the copolymer.

2. A color filter as claimed in claim 1, wherein said copolymer is a styrene-maleic anhydride copolymer.

3. A color filter as claimed in claim 2, wherein said molar content x is from 0.80 to 0.55 and y is from 0.20 to 0.45.

4. A color filter as claimed in claim 1, wherein said primary amine is benzylamine or phenethylamine.

5. A color filter as claimed in claim 4, wherein said molar content x is from 0.80 to 0.55 and y is from 0.20 to 0.45.

6. A color filter as claimed in claim 1, wherein said molar content x is from 0.80 to 0.55 and y is from 0.20 to 0.45.

7. A color filter as claimed in claim 1, wherein the content of the resin is from 20 to 90% by weight, the content of the addition polymerizable monomers is from 10 to 80% by weight, and the content of the photopolymerizable initiator or initiator system is 0.1 to 20% by weight, based on the total solids content of the photopolymerizable composition.

* * * * *